Nov. 11, 1958
A. C. POLIZZI
2,859,684
COFFEE FILTERING RETAINERS
Filed Feb. 19, 1951
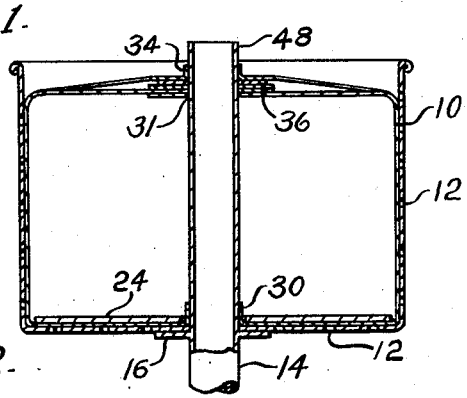
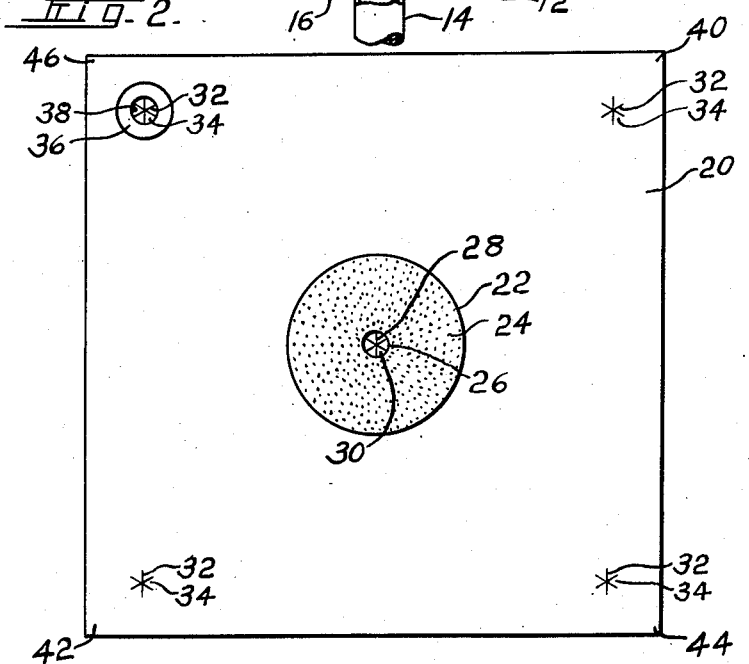
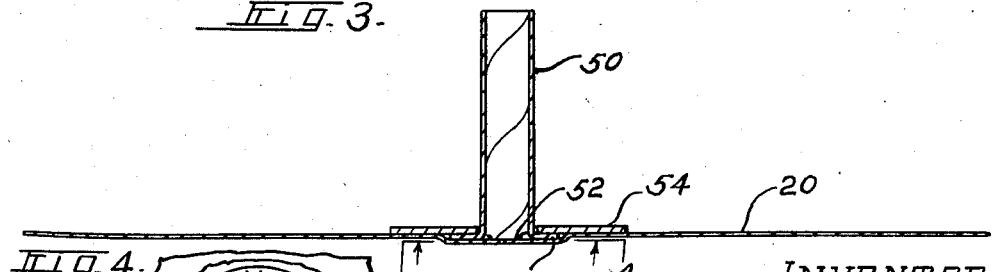
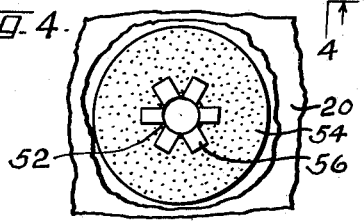
INVENTOR
ANTHONY C. POLIZZI
BY
ATTORNEY

United States Patent Office 2,859,684
Patented Nov. 11, 1958

2,859,684

COFFEE FILTERING RETAINERS

Anthony C. Polizzi, Rochester, N. Y.

Application February 19, 1951, Serial No. 211,589

1 Claim. (Cl. 99—310)

This invention relates to a coffee filtering retainer, and more particularly to disposable porous filtering sheet constructions adapted to be placed in the perforate cup of a coffee percolator, to act as a temporary disposable wrapper or liner and filter for coffee placed in the cup.

In the preparation of coffee, as by percolation, it is usual to provide a perforate cup for containing loose ground coffee through which boiling hot water passes, such water in trickling through the loose ground coffee absorbing the flavor and strength. While various cartridge containers of filtering material have been proposed to contain such loose ground coffee during the percolation of water therethrough, such cartridges, being of specific size, are not readily adaptable to the brewing of different quantities of coffee. Further, such containers, being a manufactured item, require filling during manufacture, far in advance of usage, so that coffee contained therein has the opportunity to lose its freshness.

The present invention is directed to a simple filtering and retaining structure, readily manufacturable at low cost, and in large quantities, the structure being such as to be readily insertable into the perforate percolator cup of a coffee percolator, and be disposable with the spent coffee grounds after each brew. The structure, being preferably formed of porous fibrous material such as tissue, but suitably reinforced, filters the coffee, keeping the grounds and dregs out of the pot below, and forms a container having many of the advantages of a cartridge. The structure is readily inserted into the perforate cup, filled to any desired degree with fresh coffee, and readily removed intact in the manner of a cartridge with the spent coffee grounds after the brew is completed. The filter, with its reinforcing features, assures a clear brew free from fine grounds or dregs, which in ordinary practice, find their way through the perforations of the coffee-containing cup.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claim.

Figure 1 is a vertical sectional view taken through the perforate percolator cup of a coffeepot, showing the filtering retainer in position;

Figure 2 is a plan view of the filtering retainer;

Figure 3 is a vertical section through a modified form of the filtering retainer in which a vertical sleeve has been added; and Figure 4 is a fragmentary sectional view taken substantially on the line 4—4 of Figure 3.

Referring to Figures 1 and 2, there is shown the usual coffee percolator perforate cup 10 having perforations 12 in its bottom and side walls. The cup is mounted upon the percolator tube 14, resting on a shoulder 16 in the usual manner, it being understood that upon the boiling of the water from which the coffee is to be made, water is driven up the percolator tube under steam vapor pressure and caused to spill over the top dripping down through the cup.

In order to filter and retain the ground coffee within the cup 10, there is first inserted into the cup the filter sheet construction comprising the invention. As shown in Figure 2, such construction comprises a sheet 20 of porous tissue paper or the like having a satisfactory wet strength, which may be substantially square as shown, and to which is attached, centrally thereof, a reinforcing disk 22 of relatively stiff, heavy paper stock or thin cardboard. Such disk, being relatively impervious, may be provided with a multiplicity of fine pin holes 24, and has a circular aperture 26 in the center so as to permit proper positioning of the disk within the cup 10 and threading over the percolator tube 14. The disk may be secured to the porous tissue 20 by suitable water and heat resistant adhesive, or, if desired, may be attached by a multiplicity of staples, or other suitable means. The tissue extending over the aperture 26 is radially slitted as at 28 to provide a plurality of segmental ears 30. In each of the corners of the sheet of porous tissue, the paper is slit to provide in effect apertures 31 adapted to be threaded over the percolator tube. The radial slits 32 form segmental ears 34. The aperture formed by such slits in one of the corners is preferably reinforced by a ring of relatively stiff thin paper or cardboard such as 36, the central aperture 38 of the ring being of a diameter substantially the same as the aperture 26 in the disk 22. Such ring may be placed on either side of the tissue as may be desired. If desired, the remaining apertures formed by the slits 32 may be similarly reinforced, but such procedure, while convenient, and affording strength, is not essential to the satisfactory operation of the filtering retainer construction.

In practice, the disk 22 and porous sheet 20 will be inserted into the perforate cup 10 in the manner shown in Figure 1, it being desirable to have the disk 22 of such a diameter as to readily fit within cups of standard diameter. In threading the percolator tube 14 through the aperture 26, the ears 30 will be bent upwardly along the tube and tend to form sealed engagement with the cylindrical side wall of such tube. The porous tissue 20 surrounding the disk 22 will be folded upwardly along the cylindrical side wall of the cup 10. After insertion into the cup in the manner described, a suitable quantity of ground coffee will be placed within the cup as lined by the disk 22 and porous tissue. Thereafter, the opposite corners 40 and 42 will be folded over toward the center and the aperture formed by the slits 34 in the respective corners will be threaded over the percolator tube 14. Thereafter, the corner 44 will be folded over toward the center and its aperture threaded upon the percolator tube 14, following which the corner 46 with the reinforcing ring 36 will be folded over and the aperture 38 threaded over the percolator tube 14. The corners will be nested together as shown in Figure 1, and the ears 34 formed by the slits 32 will tend to extend upwardly along the side wall of the percolator tube and form a seal. The structure will thus form in conjunction with the percolator tube 14, an annular cartridge adapted to contain and retain the ground coffee within the cup.

The percolator cup is then ready for brewing the coffee, it being understood that hot water through boiling action is driven up through the percolator tube 14, overflowing the upper end 48 of the tube and thereafter seeping down through the porous sheet 20, through the coffee contained therein, through the pin holes of the disk 22 and the underlying porous tissue. The arrangement is such as to prevent solids in the form of fine coffee grounds from leaving the cup 10, thereby providing a clear, dregless coffee brew. When it is desired to dispose of the grounds, it will appear that the porous tissue paper upon lifting the cup and tube out of the coffee pot, may be caused to drop out of the cup carrying the grounds completely wrapped, thereby dispensing with the usual necessity for thorough washing of the cup to remove the grounds therefrom, and particularly grounds which ordinarily tend to lodge themselves within the perforations of the cup. Thus, the arrangement simplifies the cleaning of the coffee percolator parts, making it merely necessary to rinse the parts prior to re-using the percolator.

In Figures 3 and 4, there is shown a modified form of the invention in which there is provided an upstanding tube 50 mounted in the aperture 52 of the disk 54, such disk being similar to the disk 22 in that it is provided with numerous pin holes. The tube has an internal diameter sufficient to easily slide over the standard percolator tube, and may be of spirally wrapped heavy paper tubing or light cardboard tubing. The tube 50 is slit longitudinally a short distance at one end to provide a series of tongues 56 which may be splayed radially for securing to the under surface of the disk 54. The tongues may be secured by adhesive, resistant to hot water, or may be secured by stapling or other means. The sheet of porous tissue 20 is laid over the bottom of the disk 54 and tongues 56, and is also secured as by adhesive, stapling or other suitable means as described in the form shown in Figures 1 and 2.

In the arrangement shown in Figures 3 and 4, the corners of the tissue may be provided with slightly larger apertures than those formed by the slits 32 in Figure 2, in order to accommodate the slight increase in outside diameter of the tube 50. It will be apparent that the form shown in Figures 3 and 4 will be utilized in substantially the same manner as the form shown in Figures 1 and 2. It will also appear that by reason of the tubular member 50, the construction may be more readily placed within the cup 10, the tube 50 serving as a convenient handle; and likewise upon removing the filtering retainer from the cup, the tube 50 may be employed as a means for lifting the assemblage without the necessity of removing the percolator mechanism from the pot or inverting the pot. At the same time, such tube with its relatively solid connection with the reinforcing disk 54 acts as an additional seal in preventing grounds from escaping from the liner into the cup.

It will thus be seen that there is provided a relatively inexpensive construction which may be sold in large quantity and one such filtering retainer being utilized each time it is desired to brew coffee. By reason of the filtering action of the porous tissue, a clear brew is assured, as well as confinement of the grounds within the cup. Through the reinforcing disk, the construction is such as to have sufficient body or strength to assure removal of the construction from the cup intact after coffee brewing has been completed. The reinforcing disk assists in providing sufficient strength to lend support to the assemblage, filled with coffee grounds, though the tissue may be weakened by the steeping action.

While several embodiments of the invention have been illustrated and described, it is to be understood that the invention is not limited thereto. As various changes in the construction and arrangement may be made without departing from the spirit of the invention, as will be apparent to those skilled in the art, reference will be had to the appended claim for a definition of the limits of the invention.

What is claimed is:

A disposable coffee filtering retainer adapted for use in a percolator cup having a central percolator tube extending therethrough comprising, a sheet of porous filter tissue, substantially square in shape, a fibrous central circular stiffening disk attached to said tissue on the upper side and centrally thereof, said disk being of a diameter to readily fit within a percolator cup and lie on the bottom thereof, and having a central aperture for the reception of a percolator tube, said tissue lying across said central aperture and being severed radially therein with respect to and within said aperture to provide a plurality of sector-shaped ears for engaging the side wall of a percolator tube when projected through said aperture, said tissue sheet having edge dimensions at least three times the diameter of said disk and having apertures in the four corners thereof adapted to be threaded over a percolator tube, said sheet being otherwise imperforate, whereby the tissue sheet and disk are adapted to form a liner and annular ground coffee retainer with the tissue sheet acting as a filter when positioned within a percolator cup and around a percolator tube.

References Cited in the file of this patent

UNITED STATES PATENTS

| | | |
|---|---|---|
| 142,195 | Blaisdell et al. | Aug. 26, 1873 |
| 1,183,721 | Bowman | May 16, 1916 |
| 1,454,739 | Holland | May 8, 1923 |
| 1,505,999 | Gereke | Aug. 26, 1924 |
| 1,767,915 | Bugg | June 24, 1930 |
| 1,876,474 | Starkey | Sept. 6, 1932 |
| 2,104,686 | Wood | Jan. 4, 1938 |
| 2,109,624 | Ramstedt | Mar. 1, 1938 |
| 2,115,122 | Prudden | Apr. 26, 1938 |
| 2,123,054 | Lamb et al. | July 5, 1938 |
| 2,243,895 | Brown | June 3, 1941 |
| 2,460,735 | Carroll | Feb. 1, 1949 |
| 2,623,450 | Wier | Dec. 30, 1952 |